July 22, 1958 W. H. DU SHANE 2,844,397
HITCH DEVICE
Filed March 26, 1953 2 Sheets-Sheet 1
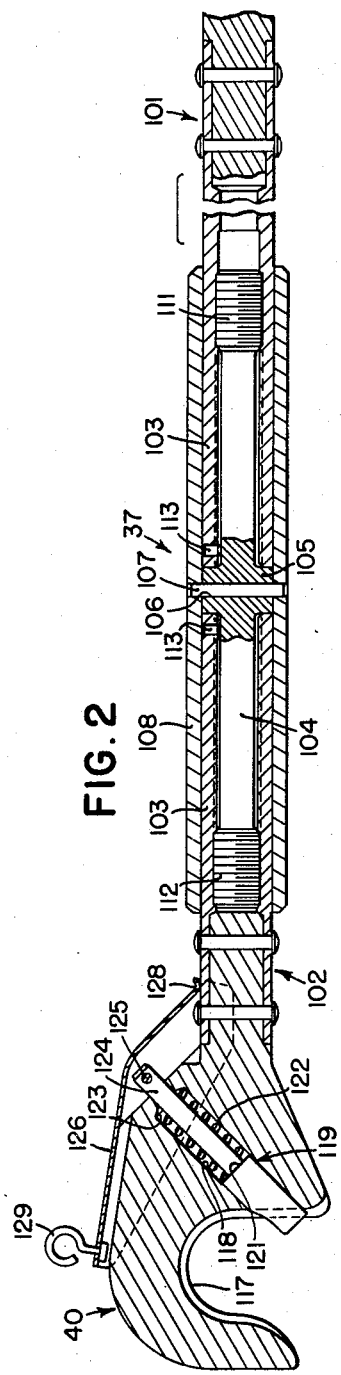
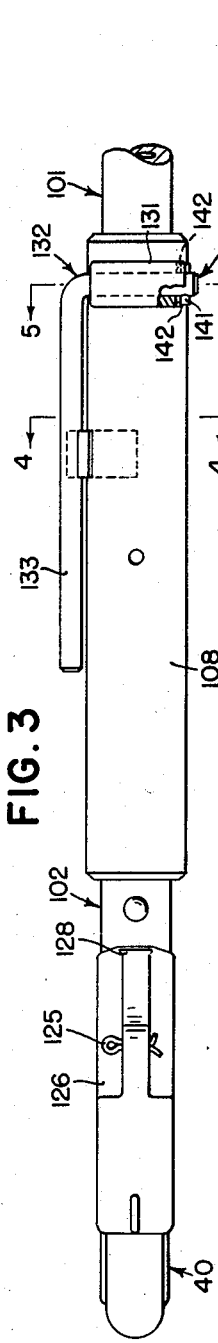
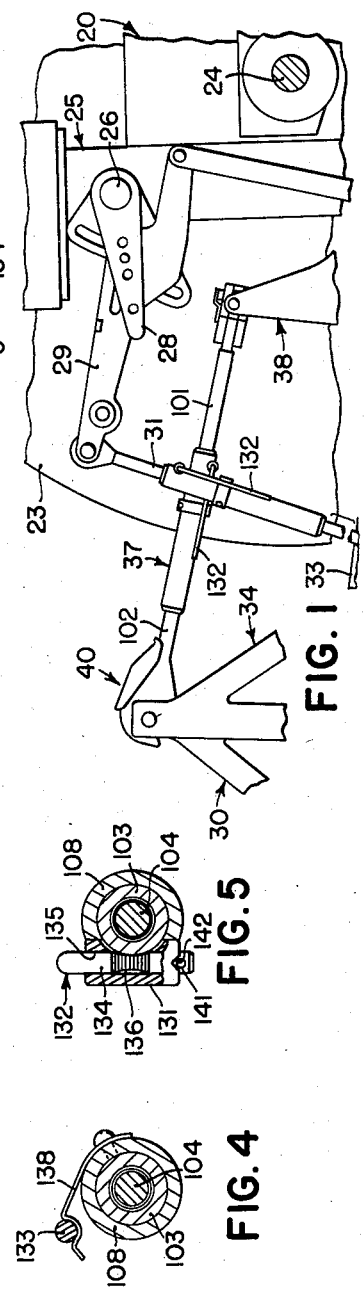
INVENTOR.
WALLACE H. DU SHANE
BY
ATTORNEYS July 22, 1958 W. H. DU SHANE 2,844,397
HITCH DEVICE
Filed March 26, 1953 2 Sheets-Sheet 2
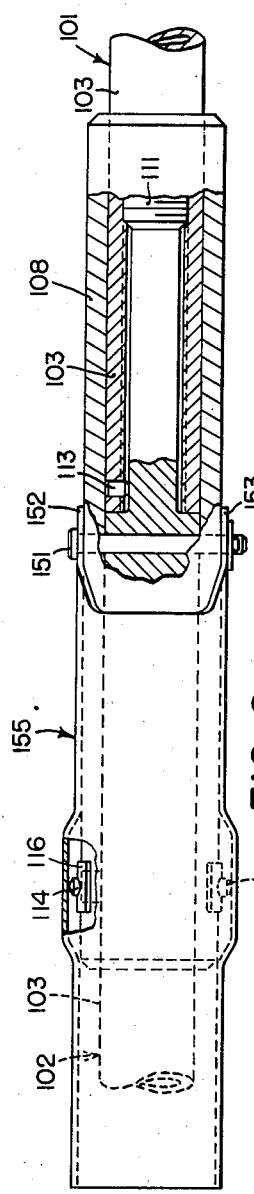
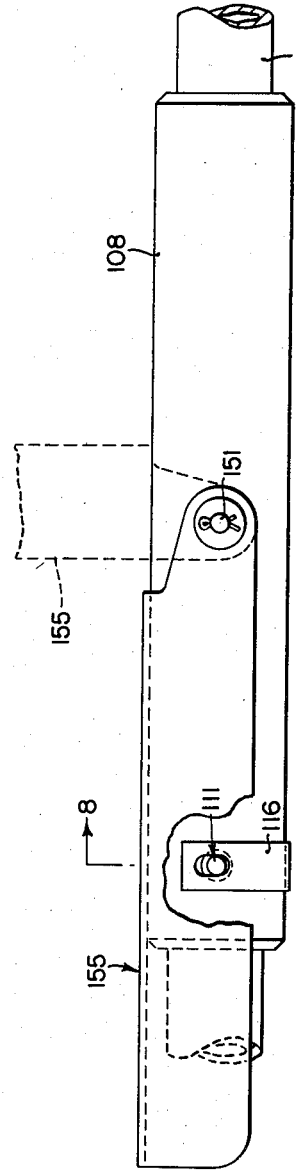
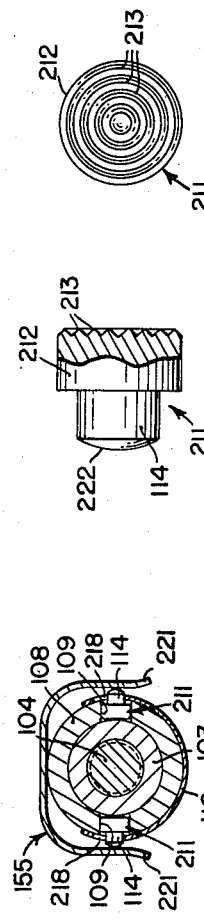
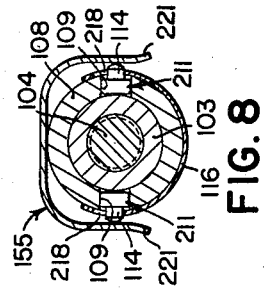
INVENTOR.
WALLACE H. DU SHANE
ATTORNEYS

United States Patent Office 2,844,397
Patented July 22, 1958

2,844,397
HITCH DEVICE

Wallace H. Du Shane, Waterloo, Iowa, assignor to Deere Manufacturing Co., Dubuque, Iowa, a corporation of Iowa Application March 26, 1953, Serial No. 344,866

4 Claims. (Cl. 287—60)

The present invention relates generally to agricultural implements and more particularly to hitch devices and the like for connecting an implement with a propelling tractor.

The object and general nature of the present invention is the provision of a new and improved adjusting and connecting link adapted to be incorporated in a hitch device of the type that connects an implement with the rear of a tractor, whereby the implement is not only propelled by the tractor in operation but also is carried by the tractor during transport. More specifically, it is a feature of this invention to provide a link device that includes new and improved means for adjusting or changing the effective length of the link device and, additionally, includes new and improved means providing for connection of one end of the link device with an associated tractor and/or implement.

A further feature of this invention is the provision of means incorporated in the adjustable link whereby the latter is effectively retained in adjustment even though subjected to jars, vibration and other displacing factors, as may be encountered when the outfit is driven over uneven terrain or from other causes.

These and other objects and advantages of the present invention will be apparent to those skilled in the art after a consideration of the following detailed description, taken in conjunction with the accompanying drawings, in which:

Figure 1 is a fragmentary side view showing a portion of a tractor-implement hitch arrangement in which the principles of the present invention have been incorporated.

Figure 2 is a longitudinal sectional view showing, at an enlarged scale, the adjusting and attaching means incorporated in the upper link of the hitch device shown in Figure 1.

Figure 3 is a top view of the adjustable link means shown in Figure 2.

Figure 4 is a sectional view taken generally along the line 4—4 of Figure 3.

Figure 5 is a sectional view taken generally along the line 5—5 of Figure 3.

Figure 6 is a top view, similar to Figure 3, showing a modified form of adjustable link means.

Figure 7 is a side view of the link means shown in Figure 6.

Figure 8 is a sectional view taken generally along the line 8—8 of Figure 7.

Figure 9 is an enlarged view of one of the link-engaging plungers.

Figure 10 is a view of the link-engaging face of the locking plunger shown in Figure 9.

Referring first to Figure 1, the present invention has been shown as incorporated in a tractor and plow outfit. The tractor is indicated by the reference numeral 20 and includes traction wheels 23 supported on the outer ends of axle shafts 24. The power plant of the tractor is arranged, as is conventional so far as the principles of the present invention are concerned, to actuate a power lift mechanism 25 that includes, among other things, a transverse rockshaft 26 that is connected through lift arms 28 and pivoted levers 29 to raise and lower a pair of generally vertically extending lift links 31, the lower ends of which are connected to a pair of draft links 33. The implement, which is indicated in its entirety by the reference numeral 30, includes mast structure 34 that is adapted to be connected to the tractor through the lower tension links 33 and an upper compression link 37, the front end of the latter being connected with the tractor through a bell crank 38 which, per se, forms no part of the present invention. In order to adjust the position of the implement relative to the tractor, one of the links 31 may be manually adjustable, and the compression link 37 may also be manually adjustable, the latter also being connected with the implement 30 through a quick-attachable connection 40, which will be described below in detail. The links 31 and 37 may be substantially identical, particularly with respect to means for adjusting their effective lengths, and hence so far as the adjusting feature is concerned, a detailed description of one of the links 31 and 37 will suffice.

Referring now to Figure 2, the upper link 37 comprises front and rear members 101 and 102, each of which is provided with a sleeve-like interiorly threaded tubular part 103. Operatively disposed within the sleeve-like parts 103 is a threaded adjusting shaft 104 having a centrally enlarged portion 105 that is apertured, as at 106, to receive an attaching pin 107 by which an outer sleeve 108 is fixed to the adjutsing shaft 104. The threaded sections, 111 and 112, of the latter are of enlarged diameter, and pins 113, fixed to the inner end of each of the sleeves 103, prevent the shaft 104 from being completely disconnected from either of the sleeves 103, the pins 113 engaging the raised threaded portions 111 and 112 at the maximum extent of longitudinal elongation.

The hook section 40 of the link member 37 includes a ball-engaging recess 117 adjacent which is an angularly disposed bore 118 in which a locking pin 119 is disposed. The latter is shouldered, as at 121, and receives a spring 122 extending between the shoulder 121 and a shoulder 123 at the bottom of the bore 118. The stem 124 of the locking pin 119 extends outwardly of the hook end 40 and is apertured to receive a cotter 125, or other suitable fastening means, by which a handle 126 is connected with the plunger or detent 119. The handle is formed with a curved section 128 at one end to serve as a fulcrum engaging the adjacent end of the sleeve 103. An eye or hook 129 is fixed to the handle 126 and provides means by which a cable or the like may be connected with the handle, if desired. Raising the handle 126 serves to withdraw the plunger 119 within the bore 118 to release the ball connector associated therewith.

In order to preserve and maintain any particular adjustment of the member 37, suitable locking means is provided and which will now be described. A transversely apertured section in the form of a boss 131 is fixed in any suitable way to the end of the sleeve 108 and rockably receives manually operable part 132 that includes a handle section 133 and locking means in the form of a right angled portion 134 that is connected rigidly to the handle section 133 and disposed within the bore 135 in the boss 131. The locking section 134 of the member 132 is provided with a narrowed section 136 that is roughened, as by knurling or the like, and this portion 136 of the locking member 132 is so shaped as to be adapted to be wedged tightly against the associated sleeve section 103 by a relatively small axial movement of the locking section 134 in the aperture or bore 135. A spring member 138 is fixed to the outer or rotatable sleeve member 108 and acts against the handle section 133 to yieldably urge the narrowed clamping portion 136 of the locking handle 132 against the sleeve 103 so as to prevent movement of the sleeve 108 relative thereto in at least one direction. The end of the locking handle section 134 carries a cross pin 141 which is disposed in a pair of V-shaped notches 142 formed in the end of the boss 131. Therefore, whenever the handle 143 is turned away from the spring 138 in either direction, the cam notches 142 serve to positively shift the locking section 134 into a position releasing the sleeve 108 for turning relative to the sleeve section 103, the handle section 133 then being usable as means for turning the outer sleeve 108 to extend or retract the link member 37.

Either or both of the lifting link members 31 may be provided with adjusting means substantially identical with that just described, and hence, in order to illustrate this arrangement, the same reference numerals have been applied, where possible, in Figure 1.

A modified form of adjustable link is shown in Figs. 6–10. In this form of the invention certain parts are identical, or substantially so, with parts shown in Figs. 2 and 3, and those parts have been indicated by the same reference numerals used above. In the form of the invention shown in Figs. 6–10, the pin 107 is replaced by a longer pin 151 that extends not only through the enlarged portion 105 of the threaded inner shaft member 104 but also through the ears 152 and 153 that are formed by the bifurcated portion of a generally semicircular handle member 155 that is thus pivotally mounted by the pin 151 on the outer sleeve 108. As best shown in Fig. 8, the U-shaped or generally circular handle member 155 is adapted to snugly embrace the outer sleeve 108 when the member is in the position shown in Fig. 7. In this position of the handle member 155, the outer sleeve 108 is locked against rotation relative to the two sleeve sections 103, and in order to provide this locking action, the left end (as viewed in Figure 6) of the outer sleeve 108 is provided with a pair of diametrically opposed apertures 109 in each of which a locking means in the form of a stud 211 is disposed. As best shown in Figures 8 and 9, each of the locking studs 211 includes an enlarged head section 212 having ridges 213 on its outer face, each locking stud 211 also including a plunger or shank section 114 extending radially outwardly of the sleeve openings 109. For holding the locking studs 211 in place a circular retaining spring 116 is disposed about the sleeve 108, the spring having slots 218 in its end portions dimensioned to receive the shanks 114 of the associated locking studs. It will be noted from Figure 8 that the portions of the handle member 155 associated with the studs 211 are flared outwardly, as at 221, and from Figure 9 it will be noted that the outer ends of the shanks or plunger 114 are rounded, as at 222. The handle member 155 is formed of spring or spring-like material and is so dimensioned and shaped that when the handle 155 is closed about the sleeve 108 the side sections 221 press with sufficient force against the plungers 211 to effectively lock the sleeve 108 against rotation relative to the associated inner sleeve section 103. Thus, the side section forms, in effect, means operatively connecting the handle 155 with the associated locking studs 211 so that when the handle 155 is disposed in the full-line position (Fig. 7), the outer sleeve 108 is locked against rotation, and hence the link member is held in the selected adjusted position. When the handle member 155 is swung outwardly, as to the dotted-line position shown in Figure 7, the plungers 211 are released and the handle may then be used to turn the sleeve 108 for adjusting the effective length of the link member.

While I have shown and described above the preferred structure in which the principles of the present invention have been incorporated, it is to be understood that our invention is not to be limited to the particular means shown and described above, but that, in fact, widely different means may be employed in the practice of the broader aspects of our invention.

What I claim, therefore, and desire to secure by Letters Patent is:

1. An adjustable link structure comprising a pair of axially adjustable parts, each including a sleeve section interiorly threaded, a rotatable shaft having threaded sections at each end and respectively engaging said sleeve sections and outer sleeve enclosing said sleeve sections, and rotatable relative thereto, means connecting the outer sleeve with said rotatable shaft, whereby rotation of said outer sleeve relative to said sleeve sections serves to adjust said parts axially, a handle member pivoted to said outer sleeve and adapted either to lie along said outer sleeve or to extend generally outwardly therefrom, said handle member when extended outwardly serving as means for rotating said outer sleeve, a transversely apertured section on said outer sleeve, the aperture in said latter section communicating with the adjacent external surface portion of the associated sleeve section, locking means movable in said aperture and shiftable toward and away from said surface portion of the associated sleeve section for locking the latter and the outer sleeve against rotation, and means connecting the handle member with said locking means.

2. An adjustable link structure comprising a pair of axially adjustable parts each including a sleeve section interiorly threaded, a rotatable shaft having a threaded section at each end, said threaded sections respectively engaging said sleeve sections, an outer sleeve enclosing said sleeve sections, means connecting the outer sleeve with said rotatable shaft, said outer sleeve having a pair of diametrically aligned apertures therein communicating with the adjacent portions of the associated inner sleeve section, a locking member movable generally radially in each of said apertures, and a handle for rotating said outer sleeve, said handle including spaced apart means engageable with the outer portions of both of said locking members for forcing the latter inwardly into locking engagement with the associated inner sleeve section.

3. An adjustable link structure comprising a pair of axially adjustable parts each including a sleeve section interiorly threaded, a rotatable shaft having threaded sections at each end and respectively engaging said sleeve sections, and outer sleeve enclosing said sleeve sections, means connecting the outer sleeve with said rotatable shaft, a handle member generally U-shaped in cross section pivotally connected with said sleeve for rotating the same to adjust said parts, a pair of locking members carried in generally diametrically opposed relation by said sleeve and engageable with the associated inner sleeve section for locking the latter and said sleeve against rotation, said U-shaped handle member having side portions shaped and dimensioned to force said locking members into engagement with said sleeve section when the handle is shifted into position embracing said sleeve.

4. An adjustable link structure comprising a pair of generally axially shaftable parts, a sleeve surrounding said parts and connected to shift the latter, one relative to the other, by rotating said sleeve, a handle member pivoted to said sleeve and adapted either to lie along said sleeve or to extend generally outwardly therefrom, said handle member when extended outwardly serving as means for rotating said sleeve, there being a pair of diametrically aligned openings formed in said sleeve, a pair of locking parts disposed in said openings and movable generally radially inwardly therein into locking engagement with the associated part, each of said locking parts having outer ends that are reduced in diameter and extend outwardly of the sleeve, a resilient retaining member disposed about said sleeve and having slots receiving said outer ends of the locking parts, and said handle member having a U-shaped resilient part adapted to engage the outer ends of said locking parts and force the latter into engagement with the associated axially shiftable part for locking the sleeve against rotation.

References Cited in the file of this patent

UNITED STATES PATENTS

| | | |
|---|---|---|
| 1,366,732 | Hoyt | Jan. 25, 1921 |
| 2,703,723 | Hess | Mar. 8, 1955 |

FOREIGN PATENTS

| | | |
|---|---|---|
| 57,678 | Austria | Feb. 10, 1913 |
| 307,898 | Germany | Sept. 11, 1918 |
| 200,236 | Canada | May 25, 1920 |
| 223,238 | Great Britain | Dec. 3, 1925 |